United States Patent [19]

Freyaldenhoven

[11] Patent Number: 5,758,969

[45] Date of Patent: Jun. 2, 1998

[54] INSTRUMENT FOR MEASURING THE ENERGY OF OPTICAL RADIATION PARTICULARLY LASER RADIATION

[75] Inventor: Udo Freyaldenhoven, Heistern, Germany

[73] Assignee: Urenco Deutschland GmbH, Jülich, Germany

[21] Appl. No.: 779,055

[22] Filed: Jan. 6, 1997

Related U.S. Application Data

[63] Continuation of PCT/EP95/04814, Dec. 7, 1995.

[30] Foreign Application Priority Data

Jan. 12, 1995 [DE] Germany ............... 195 00 684.4

[51] Int. Cl.$^6$ .................... G01K 17/00; G01K 17/06
[52] U.S. Cl. ...................................... 374/32; 374/39
[58] Field of Search ................................ 374/32, 39

[56] References Cited

U.S. PATENT DOCUMENTS

| | | | |
|---|---|---|---|
| 3,939,706 | 2/1976 | Pinson | 374/32 |
| 4,325,252 | 4/1982 | Miller et al. | 374/32 |
| 4,441,405 | 4/1984 | Takeuchi | 374/32 |
| 4,740,763 | 4/1988 | Wilhelm et al. | 374/32 |
| 5,156,459 | 10/1992 | Baker et al. | 374/32 |
| 5,678,924 | 10/1997 | Naquin et al. | 374/32 |

FOREIGN PATENT DOCUMENTS

| | | |
|---|---|---|
| 0 491 210 | 6/1992 | European Pat. Off. |
| 32 47 794 | 6/1994 | Germany . |
| 2 262 804 | 6/1993 | United Kingdom . |

OTHER PUBLICATIONS

T. R. Scott, "Megawatt Laser Calorimeter Design", *IEEE Instrumentation and Measurement Technology Conference*, Optical Electronic Metrology Group, 814.02, National Institute of Standards and Technology (NIST) Boulder, CO 80303.

*Primary Examiner*—Diego F. F. Gutierrez
*Attorney, Agent, or Firm*—Klaus J. Bach

[57] ABSTRACT

In an instrument for measuring the energy of optical radiation, particularly laser radiation, a number of radiation absorbing plate-like foraminous elements are disposed in a tubular housing such that the radiation entering at one end of the housing is successively absorbed by the radiation absorbing elements which are heated thereby, and a fan disposed at the other end of the housing moves cooling air through the housing and through the radiation absorbing elements whereby the air is heated. From the temperature increase of the cooling air which is measured by a temperature measuring element, the energy of the optical radiation entering the housing is determined.

9 Claims, 2 Drawing Sheets

INSTRUMENT FOR MEASURING THE ENERGY OF OPTICAL RADIATION PARTICULARLY LASER RADIATION

This is a Continuation-in-Part application of international application PCT/EP95/04814 filed Dec. 07, 1995 designating the U.S. and claiming the priority of German patent application 195 00 687.4 filed Jan. 12, 1995.

BACKGROUND OF THE INVENTION

The present invention relates to an instrument for measuring the energy of optical radiation, particularly laser radiation, wherein the instrument comprises a tubular housing with two end faces through one of which the radiation to be measured enters the housing which includes several radiation absorbing elements and a temperature measuring arrangement to determine the temperature increase effected by the absorbed radiation wherefrom the energy of the radiation is calculated.

Instruments for measuring the energy of optical radiation are known for example from WO91/05228, EP 0 285 785 A1 and U.S. Pat. No. 3,596,514. DE 32 47 794 A1 further discloses an attenuator for optical radiation wherein one or several foraminous surface areas such as metal screens are disposed in a housing transverse to the travel direction of the radiation. The radiation beams which are deflected or reflected by the surface area structures, for example, the wires of the metal screens are absorbed by the housing walls. This device however is not equipped for measuring the radiation energy of the optical radiation.

U.S. Pat. No. 5,114,228 discloses an apparatus for measuring the energy of rapidly pulsating radiation which apparatus includes a measuring head provided with cooling fins and having a heat sensor, preferably a thermo-column and a rapid radiation detector. The heat sensor absorbs about 95% of the radiation energy whereas the radiation detector senses a part of the scattered radiation. From the measurement signals of the sensor and of the detector and from the pulse frequency, the energy of an impulse is determined. In this case, the maximally admissible radiation energy is limited by the thermal loading capacity of the heat sensor.

U.S. Pat. No. 3,282,100 discloses a calorimeter for measuring optical radiation energy which includes, in a heat insulated housing a thin, electrically insulated resistance wire of a predetermined length. The radiation absorbed by the thin wire pack changes the electrical resistance of the wire so that the energy of the radiation entering the housing can be determined from the resistance change. Here too, the maximum admissible radiation energy is limited by the thermal loading capacity of the wire insulation.

DE 42 43 902 A1 discloses a laser energy measuring apparatus including an absorber block preferably of metal with a temperature sensor disposed in the center thereof. The radiation reaching the surface of the absorber block increases the temperature of the block which is measured by a thermometer. As measure for determining the laser energy, the change of temperature within a predetermined time period is used. Overheating of the absorber block can be indicated by an indicating light of an arithmetic logical unit which is responsive to a suitable input signal.

DE 39 42 293 A1 discloses a method for measuring laser energy wherein an electrically energizable wire which has a temperature dependent resistance and high absorption capability and a similar compensation wire with little absorption capability are moved back and forth across the beam cross-section. A constant measuring current is supplied to both wires; the quotient of the voltages effective at the two wires serves as measurement value for the laser energy. This arrangement is used to eliminate the influence of the convection cooling in the measurement result. It is pointed out however that this arrangement permits only determination of the relative laser energy based on a particular application since the measurement value is dependent not only on the absorbed radiation components but also on the cross-section and the geometry of the laser beam.

U.S. Pat. No. 3,596,514 discloses a laser radiation energy measuring apparatus which includes a housing provided with outer cooling fins and having a radiation absorbing disc disposed within for measuring the radiation. The radial heat flow generated in the disc by the radiation absorbed thereby is measured by a special arrangement of thermo-elements (thermo columns) and is indicated as radiation energy in an evaluation apparatus.

If the radiation energy is high, however, the single disc has to be replaced by a block of absorption plates through which a coolant is conducted. The arrangement is accordingly more complicated in design and also more expensive in operation than the arrangements with cooling fins described earlier.

It is the object of the present invention to provide an instrument for measuring the energy of optical radiation which is simple in design and which permits the measurement of high radiation energies in the range of multi-KW without water cooling.

SUMMARY OF THE INVENTION

In an instrument for measuring the energy of optical radiation, particularly laser radiation, a number of radiation absorbing plate-like foraminous elements are disposed in a tubular housing such that the radiation entering at one end of the housing is successively absorbed by the radiation absorbing elements which are heated thereby and a fan disposed at the other end of the housing moves cooling air through the housing and through the radiation absorbing elements whereby the air is heated. From the temperature increase of the cooling air which is measured by a temperature measuring element, the energy of the optical radiation entering the housing is determined.

With the instrument according to the invention, the radiation entering the housing is absorbed in steps, by the material of the screen, honeycomb or grid-like structures such as wire screens which are heated thereby. The heat is removed by a well defined constant flow of air passing through the openings in the absorption structures.

The air flowing through the absorption structures is heated thereby to a degree proportional to the average radiation energy of for example a pulsed laser and can be utilized therefore for determining the radiation energy. Since the airflow can be adapted to the thermal loading capability of the absorbing structures and the energy of the radiation being absorbed, this instrument permits the accurate determination of low as well as high radiation energies.

The invention will be described below on the basis of the accompanying drawings.

DESCRIPTION OF THE INVENTION

Figure 1:
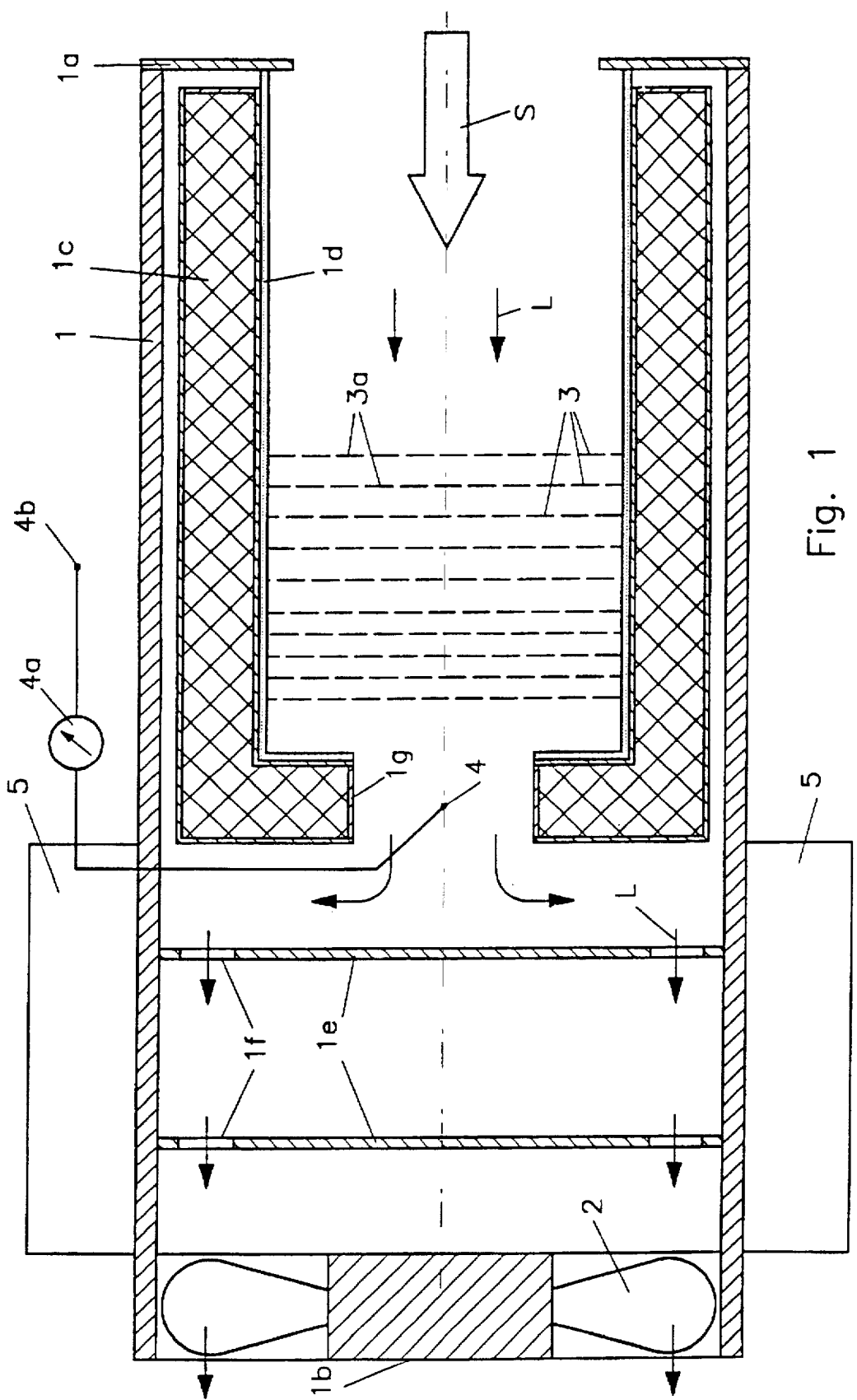
FIG. 1 is a cross-sectional representation of the measuring instrument according to the invention.

As shown in FIG. 1, the energy measuring instrument comprises a tubular housing 1 with a front end 1a through which the radiation to be measured, for example, a pulsed laser beam (arrow S) enters the housing. At its opposite end 1b, an axial venting fan 2 is mounted to the housing 1. The housing 1 comprises an outer metal tube which is provided at the inside, over somewhat more than half of its axial length, with a heat insulating layer 1c consisting for example of ceramic fiber, starting at the front end 1a of the housing 1. The inside of the heat insulating layer is lined with a ceramic paper-like sheet 1d.

In the area of the heat insulating layer 1c, radiation absorbing elements 3 are mounted into the housing 1 adjacent the ceramic sheet 1d. They consist of several screen-honeycomb-or-gridlike structures 3 such as wire screens which are arranged in spaced relationship so as to extend transversely with respect to the radiation S entering the housing 1. The various screen- honeycomb- or gridlike elements 3 are so arranged that their structures 3a are displaced with respect to one another such that the full cross-section of the radiation S is covered on its path through the grid-like elements 3 and is absorbed by the structures 3a, in other words, the optical radiation absorbing elements are displaced with respect to each other transversely to the radiation direction so that optical radiation passing through one absorbing element will be obstructed by one of the subsequent elements.

The structures 3a consist of a material with a high absorption coefficient, high melting temperature and good heat conductivity. If a wire screen for example of tungsten or steel is used the mesh width is preferably about 1.5 mm with a wire thickness of 0.15 mm.

Between the fan 2 and the heat insulating layer 1c or the elements 3, the housing 1 includes metallic baffle plates 1e with peripheral air passages 1f. As can further be seen from the figures, the insulating layer 1c is provided, in the area between the elements 3 and the baffle plates 1e, with a flange-like constriction 1g wherein a temperature sensing element 4 such as a thermocouple is disposed, in other words, the housing includes between the optical radiation absorbing elements and the baffle plates a bottle-like restriction reducing the air flow cross-section through the housing and the temperature measuring element is disposed in the area of the reduced flow cross-section.

The axial fan 2 generates a well defined constant air flow (arrows L) entering the housing at the end 1a thereof and flowing essentially parallel with the radiation S and through the openings in the elements 3 wherein the air is heated. The so-heated air then passes through the restriction 1g wherein its temperature is measured by the thermocouple 4 and is indicated by an indicating instrument 4a as a difference with respect to the room temperature 4b or directly as radiation energy of the radiation S. Then the air flow L is diverted radially outwardly by the baffle plates 1e and reaches, by way of the peripheral air passages 1f, the fan 2. In the area between the heat insulating layer 1c and the fan 2, the housing 1 is provided with radial cooling fins 5 distributed around the housing in equally spaced relationship, in other words, in the area between the insulating layer and the fan, the housing is provided with circumferentially distributed radially extending cooling fins.

Figure 2:
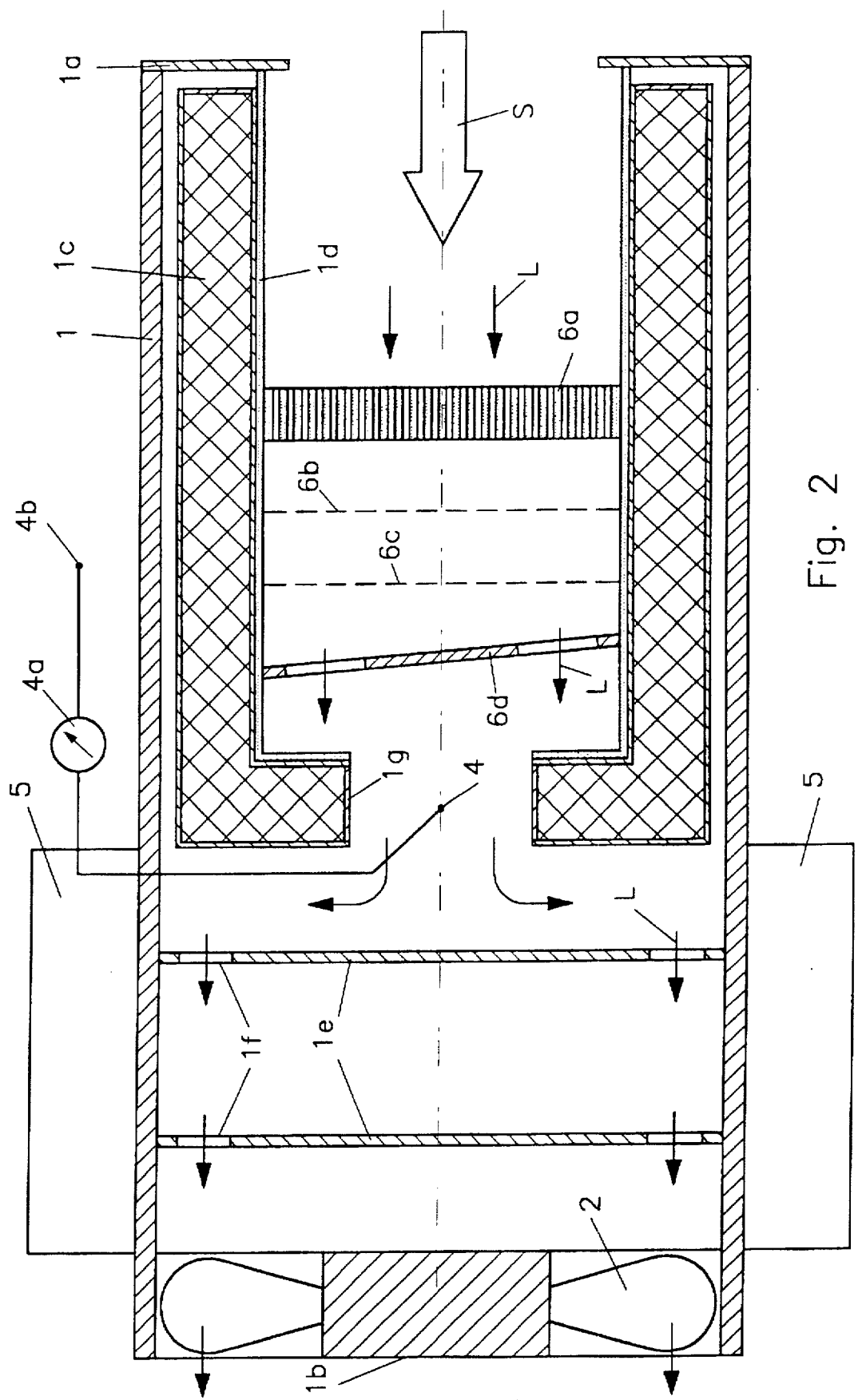
FIG. 2 shows another embodiment of the instrument shown in FIG. 1.

As shown in FIG. 2, the absorption element 3 first reached by the radiation S consists of a disc-like ceramic body 6a which has a honeycomb-like structure. The honeycombs of the disc-like body 6a have a length of 10 mm and an open width of 1.4 mm. Then follow—in the direction of radiation-grid-like absorption elements 6b, 6c. After the absorption elements 6b, 6c there is a reflection plate 6d which is provided with peripheral air passages and which is supported in the housing 1 in an inclined fashion such that all the radiation reflected therefrom is absorbed by the honeycomb structure of the ceramic element 6a. The other components shown in FIG. 2 are the same as those shown in, and described with reference to, FIG. 1.

For the arrangement of the absorption elements, it is important that all the various absorption elements which are arranged in spaced relationship are so displaced that they are subjected by the incoming radiation S to essentially the same heat load.

What is claimed is:

1. An instrument for measuring the energy of optical radiation, said instrument comprising a tubular housing with two end faces, one of said end faces for admitting the optical radiation to be measured into said housing, said housing including a plurality of optical radiation absorbing elements comprising plate-like foraminous structures arranged in spaced relationship with respect to each other and extending transverse to the direction of the optical radiation entering said housing for the adsorption of said optical radiation a fan arranged in said tubular housing for drawing air through said plate-like foraminous optical radiation absorbing elements at a constant flow rate to remove therefrom the heat generated by the absorption of said optical radiation, baffle plates with peripheral air flow passages mounted in said housing between said fan and said optical radiation absorbing elements and a temperature measuring element disposed in said housing downstream of said optical radiation absorbing elements and an indicating instrument connected to said temperature measuring element and an ambient temperature sensor for sensing the temperature of the air heated by said radiation absorbing elements for determining a temperature difference between the ambient air and the air heated by said optical radiation absorbing elements to permit determination of the energy absorbed in said housing from said optical radiation.

2. An instrument according to claim 1, wherein said optical radiation absorbing elements comprise a combination of screen-like honeycomb-like, or grid-like structures.

3. An instrument according to claim 1, wherein said optical radiation absorbing elements are displaced with respect to each other transversely to the radiation direction so that optical radiation passing through one absorbing element will be obstructed by one of the subsequent elements.

4. An instrument according to claim 1, wherein said housing includes a heat insulating layer covering said optical radiation absorbing elements along the direction of the radiation.

5. An instrument according to claim 4, wherein, in the area between said insulating layer and said fan, the housing is provided with circumferentially distributed radially extending cooling fins.

6. An instrument according to claim 1, wherein said fan is an axial fan mounted on said housing at the other end thereof opposite said one end face.

7. An instrument according to claim 1, wherein said housing includes between said optical radiation absorbing elements and said baffle plates a bottle-like restriction reducing the air flow cross-section through said housing and said temperature measuring element is disposed in the area of said reduced flow cross-section.

8. An instrument according to claim 1, wherein of said optical radiation absorbing elements, at least the element closest to said one end face is a ceramic body with a honeycomb-like structure.

9. An instrument according to claim 8, wherein, in the direction of the radiation behind said optical radiation absorbing elements, a radiation reflection plate is arranged in said housing such that the optical radiation reflected thereby is returned to said optical radiation absorbing elements.

* * * * *